April 23, 1957 W. R. TUCKER 2,789,574
FLUID PRESSURE REGULATOR
Filed Dec. 31, 1954 2 Sheets-Sheet 1
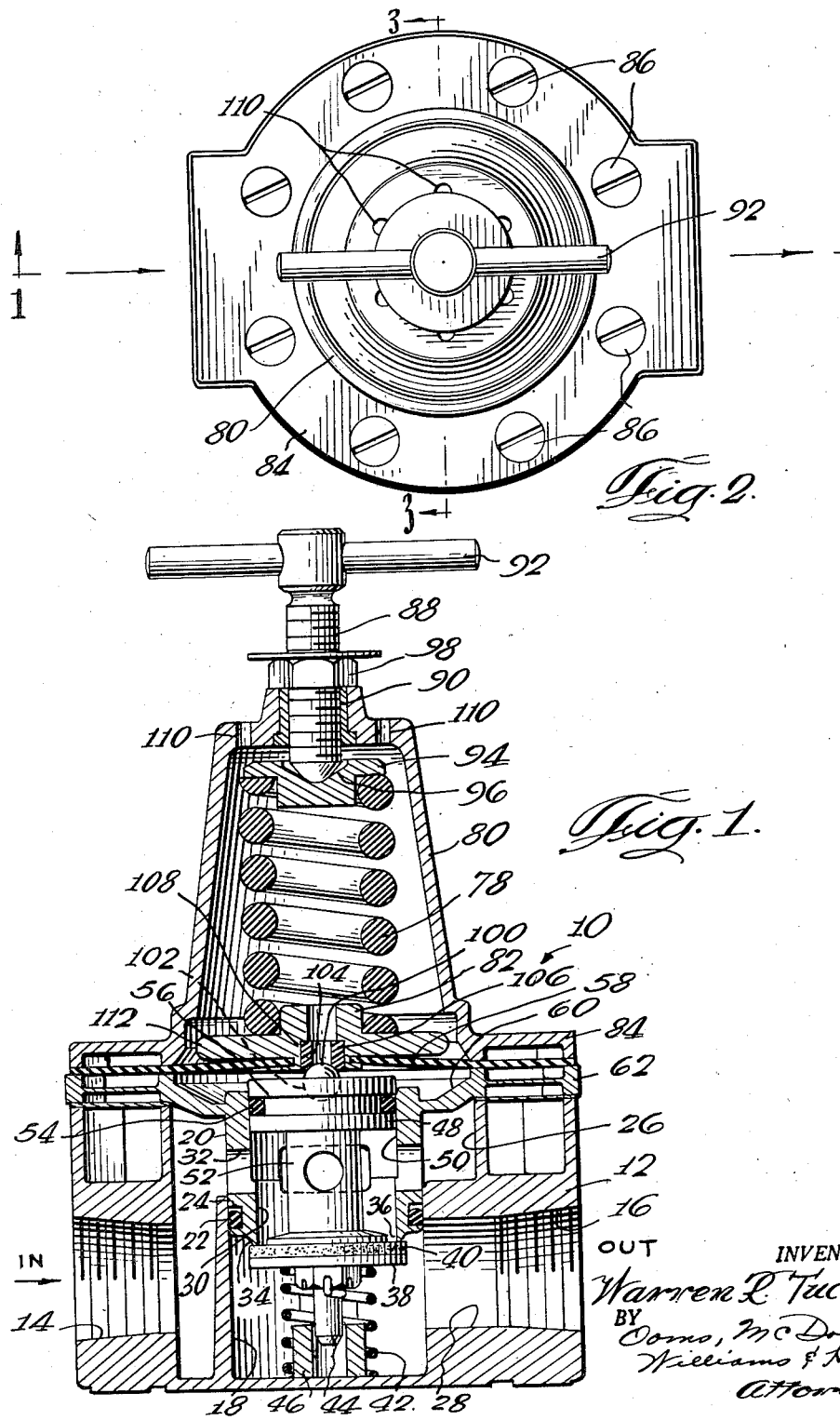
INVENTOR.
Warren R. Tucker

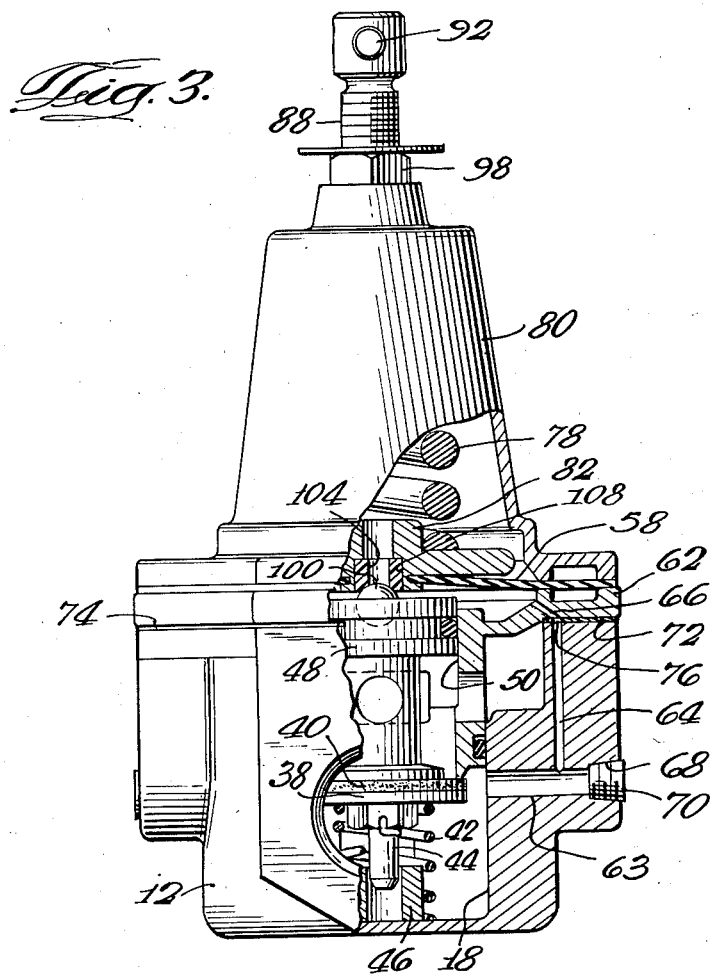
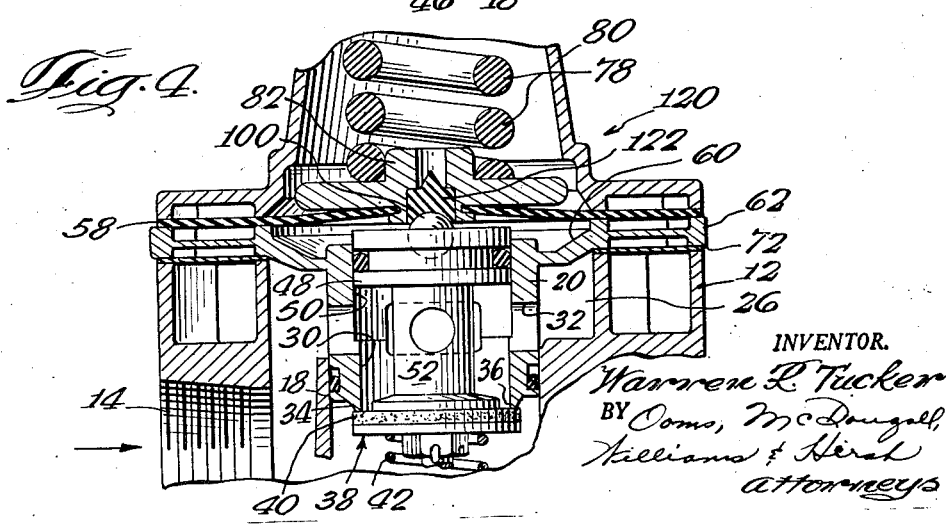

United States Patent Office 2,789,574
Patented Apr. 23, 1957

2,789,574

FLUID PRESSURE REGULATOR

Warren R. Tucker, Barrington, Ill., assignor to Hannifin Corporation, Des Plaines, Ill., a corporation of Illinois Application December 31, 1954, Serial No. 479,132

7 Claims. (Cl. 137—116.5)

One principal object of the present invention is to provide a new and improved fluid pressure regulator which is extremely compact, yet is capable of delivering fluid at a high rate of flow.

Another object is to provide an improved fluid pressure regulator which is arranged so that all of the working parts may be removed and replaced without disconnecting the body of the regulator from the pipes carrying fluid to and from the regulator.

Accordingly, a further object is to provide an improved fluid pressure regulator which is easy to service and maintain.

It is another object to provide an improved fluid pressure regulator which is effective, reliable, and long lived, yet is simple in construction, easy to manufacture, and low in cost.

Further objects and advantages of the invention will appear from the following description, taken with the accompanying drawings, in which:

Figure 1 is an elevational sectional view of an exemplary fluid pressure regulator constituting an illustrative embodiment of the invention, the view being in section and taken generally along a line 1—1 in Fig. 2;

Fig. 2 is a plan view of the regulator;

Fig. 3 is a side elevational view, partly in section along a line 3—3 in Fig. 1; and Fig. 4 is a fragmentary view similar to Fig. 1 showing a slightly modified regulator.

If Figs. 1–3 are considered in greater detail, it will be seen that they illustrate an exemplary fluid pressure regulator 10 adapted to be inserted in a fluid supply line so as to discharge fluid at substantially constant pressure. The pressure regulator is adapted to handle either a liquid or a gaseous fluid, although the embodiment of Figs. 1–3 is particularly adapted to handle a gaseous fluid such as compressed air. As will be explained in detail presently, the embodiment of Fig. 4 is particularly adapted to handle hydraulic fluid or any other liquid.

It will be seen that the regulator 10 of Figs. 1–3 is provided with a body or casing 12 which may be cast from metal. Oppositely directed internally threaded inlet and outlet openings 14 and 16 are provided in the body 12 to receive pipes (not shown) adapted to carry compressed air or other fluid to and from the regulator. In order to facilitate servicing of the regulator, the working valve parts of the regulator are received within a bore 18 which opens upwardly and extends at right angles to the direction of the inlet and outlet openings 14 and 16. An inner cylindrical housing 20 is removably received within the bore 18, a sealing ring 22 being disposed between the bore and the inner housing and being retained in an annular groove 24 formed in the lower end portion of the housing.

To afford communication between the inlet and outlet openings 14 and 16, the inlet opening 14 is connected with an annular chamber 26 which communicates with the upper end of the bore 18. A passage 28 is formed in the body 12 between the outlet opening 16 and the lower end portion of the bore 18. It will be seen that the inner housing 20 is disposed in the upper end portion of the bore and that the sealing ring 22 is positioned along the bore between the inlet and outlet openings. Formed in the housing 20 is an axial passage or opening 30. One or more radial apertures 32 extend through the cylindrical wall of the housing 20 between the annular inlet chamber 26 and the axial opening 30. Thus, the apertures 32 and the axial opening 30 are adapted to afford communication between the inlet and outlet openings 14 and 16.

To control the flow of fluid through the opening 30 into the outlet opening 16, the lower end portion of the inner housing 20 is formed into an annular, conically shaped valve seat 34 which faces downwardly, toward the outlet portion of the bore 18. The lower portion of the axial opening 30 extends through the valve seat 34 and thus defines a valve port 36.

It will be seen that a valve member 38 is movable in the bore 18 to open and close the valve port 36. In this case, the valve member 38 is in the form of a disk-shaped poppet valve fitted with an annular upwardly facing sealing ring 40 adapted to abut against the valve seat 34. A light compression spring 42 is disposed between the poppet valve 38 and the lower end of the bore 18 to bias the valve against the seat 34. A guide stem 44 extends downwardly from the valve 38 and is loosely received within a guide sleeve 46 supported on the lower end of the bore 18. Downward movement of the valve 38 is limited by engagement between the lower end of the stem 44 and the lower end of the bore 18.

In accordance with one feature of the invention, the inlet pressure on the upper side of the valve 38 is balanced by the effect of inlet pressure on a piston 48 which is movable in a bore 50 constituting the upper portion of the axial opening 30 extending through the inner housing 20. In this instance, the area of the piston 48 is generally equal to but slightly greater than the area of the valve port 36, although the area of the piston may be varied to obtain various balancing characteristics. In the illustrated construction, the piston bore 50 is slightly enlarged relative to the valve port 36. The piston 48 is disposed in the upper end portion of the bore 50 and a reduced stem 52 is arranged to extend between the lower end of the piston and the upper end of the valve 38. Thus, the inlet apertures 32 are disposed between the piston 48 and the valve 38 so that inlet pressure will be applied to the lower end of the piston and the upper end of the valve. A sealing ring 54 is provided between the piston 48 and the bore 50 and is retained in an annular groove 56 formed in the piston.

A diaphragm 58 or other pressure responsive member is provided to effect opening and closing of the valve 38 in response to pressure at the outlet opening 16. In this instance, the diaphragm 58 forms the upper wall of a diaphragm chamber 60 defined within an integral flange portion 62 on the inner housing 20. Communication between the outlet passage 16 and the diaphragm chamber 60 is afforded by passages 63, 64, and 66 (Fig. 3) drilled in the body 12 and the flange member 62. It will be seen that the passage 63 extends outwardly from the lower end of the bore 18 and terminates in an internally threaded opening 68 adapted to receive a plug 70 or a pressure gauge (not shown) to indicate the outlet pressure. A gasket 72 is received between the flange member 62 and an upper end face 74 formed on the body member 12. An aperture 76 is provided in the gasket to interconnect the passages 64 and 66.

To bias the valve 38 off its seat 34, a heavy compression spring 78 is disposed within a spring housing 80 and is arranged to act upon a member 82 mounted axially on the diaphragm 58. A mounting flange 84 is formed on the spring housing 80 to clamp the diaphragm 58 against the flange member 62 on the inner housing 20. It will be seen that a plurality of mounting screws 86 extend through the flanges 84 and 62 and are threaded into the body 12 to secure the spring housing 80 and the inner housing 20 to the body.

In the illustrated construction, the force of the spring 78 may be adjusted by turning a screw 88 threaded through an axial bushing 90 received in the spring housing 80. An operating handle 92 is provided on the upper end of the screw 88. The upper end of the spring 78 reacts against a flanged abutment member 94 having an axial recess 96 for receiving the lower end of the screw 88. A lock nut 98 is mounted on the screw 88.

In order to connect the diaphragm 58 to the valve member 38, while at the same time providing means to vent any excessive pressure in the outlet opening 16, the axial member 82 mounted on the diaphragm is adapted to engage a ball 100 which is seated in a recess 102 formed in the upper end of the piston 48. The ball 100 is adapted to open and close a vent port 104 formed in a bushing 106 which is received in an axial aperture 108 extending through the member 82. It will be seen that the vent port 104 communicates with the interior of the spring housing 80 and thence with the atmosphere through one or more apertures 110 extending through the housing 80. A flange 112 is formed on the member 82 to back up the diaphragm 58.

In the operation of the pressure regulator, compressed air or other fluid is received from a supply pipe connected to the inlet opening 14 and is discharged into an outlet pipe connected to the outlet opening 16. In the absence of fluid pressure at the inlet and outlet openings 14 and 16, the valve 38 is held off its seat 34 by the regulating spring 78. The spring 42 is of insufficient strength to close the valve 38 against the force of the heavier regulating spring 78, but the spring 42 biases the valve 38 upwardly so as to maintain the ball 100 seated over the vent port 104.

When air pressure is applied to the inlet opening 14, air flows through the passages 26, 32, and 30 and thence through the open valve port 36 into the outlet opening 16. The flow of air into the outlet opening 16 normally builds up outlet pressure, which is applied to the lower side of the diaphragm through the passages 63, 64, and 66. When the outlet pressure reaches a predetermined value, the diaphragm 58 is moved upwardly against the force of the regulating spring 78, with the result that the valve 38 is seated over the port 36. The valve 38 actually follows the diaphragm 58 upwardly by virtue of the action of the spring 42 and the action of inlet fluid pressure on the lower side of the piston 48. The action of the inlet pressure on the piston 48 is partially balanced by the action of the inlet pressure on the upper side of the valve 38, but the net effect of the inlet pressure is to raise the valve, since the area of the piston 48 is slightly greater than that of the port 36.

With the valve 38 closed, the upward force on the piston 48, resulting from the inlet pressure, is nearly balanced by the downward force on the portion of the valve 38 exposed by the port 36. Because of this balancing action, the inlet pressure has only a slight effect upon the operation of the valve 38. Accordingly, variations in the inlet pressure have only a negligible effect on the regulated outlet pressure.

When the pressure drops at the outlet opening 16, the regulating spring 78 pushes the diaphragm and the valve 38 downwardly so as to open the valve port 36 and thereby supply additional air to the outlet opening. Because of the balancing action of the piston 48, the valve port may be made unusually large without requiring a prohibitively large diaphragm. Thus, the balancing action of the piston 48 makes possible an unusually compact construction.

If the pressure at the outlet opening 16 should rise above the regulated value determined by the strength of the spring 78, the diaphragm 58 is pushed upwardly, so as to effect closure of the valve 38, as already explained. Moreover, the upward movement of the diaphragm 58 continues after the valve 38 is closed, with the result that the apertured vent bushing 106 is unseated from the valve ball 100. This opens the vent port 104 and permits air to escape from the diaphragm chamber 60 into the spring housing 80 and thence through the apertures 110 into the atmosphere. After sufficient air has been bled off from the outlet opening 16 through the diaphragm chamber 60, the spring 78 moves the diaphragm 58 downwardly until the vent port 104 is again closed by the valve ball 100. It will be understood that the strength of the spring 78, and hence the regulated outlet pressure, may be varied by adjusting the screw 88.

Fig. 4 illustrates a slightly modified pressure regulator 120 which may be employed when it is not desired to bleed off the fluid to the atmosphere under conditions of abnormally high outlet pressure. The only difference between the modified regulator 120 and the regulator 10 of Figs. 1–3 resides in the fact that the apertured vent bushing 106 is replaced by a plug 122 which is seated in the bore 108 and which is adapted to engage the ball 100 carried by the piston 48. All of the other components of the modified regulator 120 are identical with and have been given the same reference characters as the corresponding components of the regulator of Figs. 1–3.

In the modified regulator 120, the plug 122 may be disengaged from the ball 100 under conditions of abnormally high outlet pressure, but this does not result in venting of fluid from the outlet opening, because the plug 122 is solid. Accordingly, the modified regulator 120 is particularly well adapted for use with hydraulic fluid or some other liquid which it would not be desirable to discharge to the atmosphere.

Either of the regulators of Figs. 1–4 may be completely disassembled simply by removing the screws 86 and withdrawing the spring housing 80 and the inner housing 20 from the body 12. The diaphragm 58, the valve 38, and the piston 48 come away with the inner housing 20 and hence are easily serviced or replaced without removing the body 12 from the pipes which are normally threaded into the inlet and outlet openings 14 and 16. The arrangement of the inner housing 20 is particularly noteworthy in this regard since it carries most of the working parts.

Various other modifications, alternative construction and equivalents may be employed without departing from the true spirit and scope of the invention as exemplified in the foregoing description and defined in the following claims.

I claim:

1. A fluid pressure regulator, comprising a body having a substantially smooth bore therein with inlet and outlet portions adjacent opposite ends thereof, inlet and outlet ports in said body communicating with said inlet and outlet portions of said bore, an inner generally cylindrical housing slidably and removably received in said inlet end portion of said bore, said housing having an axial opening therethrough, annular sealing means between said inner housing and said bore at a point therealong between said inlet and outlet ports, said housing having an annular groove therein receiving said sealing means, said inner housing having a first end portion with an annular valve seat thereon facing toward said outlet end portion of said bore, said axial opening having a portion defining a valve port within said seat, a poppet valve movable in said outlet end portion of said bore into and out of engagement with said seat, a first spring biasing said poppet valve toward said seat, a piston movable in said axial opening and of an area generally equal to but slightly greater than the area of said valve port, said axial opening having an enlarged portion slidably receiving said piston, a reduced stem connected between said piston and said poppet valve, said housing having a radial aperture registering with said inlet port and communicating with said axial opening between said piston and said valve port, said inner housing having an integral annular flange portion detachably mounted on said body and defining one wall of a diaphragm chamber therein communicating with said axial opening on the side of said piston opposite from said radial aperture, a diaphragm opposite said piston and closing said diaphragm chamber, means disengageably clamping said diaphragm against said flange portion, passage means in said body and flange portion affording communication between said outlet port and said diaphragm chamber, an axial member mounted on said diaphragm and having an axial vent port therethrough, a valve ball mounted on said piston for closing said vent port, a second spring biasing said diaphragm toward said piston and tending to maintain said ball seated over said vent port while tending to unseat said poppet valve.

2. A fluid pressure regulator, comprising a body having a substantially smooth bore therein with inlet and outlet portions adjacent opposite ends thereof, inlet and outlet ports in said body communicating with said inlet and outlet portions of said bore, an inner generally cylindrical housing slidably and removably received in said inlet end portion of said bore, said housing having an axial opening therethrough, annular sealing means between said inner housing and said bore at a point therealong between said inlet and outlet ports, said housing having an annular groove therein receiving said sealing means, said inner housing having a first end portion with an annular valve seat thereon facing toward said outlet end portion of said bore, said axial opening having a portion defining a valve port within said seat, a poppet valve movable in said outlet end portion of said bore into and out of engagement with said seat, a first spring biasing said poppet valve toward said seat, a piston movable in said axial opening and of an area generally equal to but slightly greater than the area of said valve port, said axial opening having an enlarged portion slidably receiving said piston, a reduced stem connected between said piston and said poppet valve, said housing having a radial aperture registering with said inlet port and communicating with said axial opening between said piston and said valve port, said inner housing having an integral annular flange portion detachably mounted on said body and defining one wall of a diaphragm chamber therein communicating with said axial opening on the side of said piston opposite from said radial aperture, a diaphragm opposite said piston and closing said diaphragm chamber, means disengageably clamping said diaphragm against said flange portion, passage means in said body and flange portion affording communication between said outlet port and said diaphragm chamber, means forming an operating connection between said diaphragm and said piston, and a second spring biasing said diaphragm in a direction tending to unseat said poppet valve.

3. A fluid pressure regulator, comprising a body having inlet and outlet ports therein for receiving and discharging fluid, a passage in said body extending between said inlet and outlet ports, said passage having an annular valve seat therein facing toward said outlet port, a main valve member movable into and out of engagement with said seat for closing and opening said passage, a piston bore in said body, a piston movable in said bore and connected to said valve member for balancing inlet fluid pressure thereon, means affording communication between said inlet port and said piston bore at a point therealong between said piston and said valve member whereby fluid pressure at said inlet port will urge said piston in a direction to close said valve member, said piston being of an area generally equal to but slightly greater than the internal area of said valve seat, means on said body defining a diaphragm chamber on one side of said diaphragm, means defining a vent port extending through said diaphragm, a vent valve element on said piston for closing and opening said vent port, a regulating spring biasing said diaphragm against said vent valve element and thereby biasing said main valve member off said seat, and means affording communication between said outlet port and said diaphragm chamber whereby predetermined pressure at said outlet port will act against said spring to effect closure of said valve member, said diaphragm being moved away from said vent valve element in response to outlet pressure exceeding said predetermined pressure, so as to open said vent port.

4. A fluid pressure regulator, comprising a body having a substantially smooth bore therein, inlet and outlet openings formed in said body and communicating respectively with the upper and lower ends of said bore, an inner generally cylindrical housing having a substantially smooth outer surface slidably received in said bore, an external annular groove in said housing at a point between said inlet and outlet openings, an annular sealing member in said groove and between said housing and said bore, said housing having a passage therein affording communication between said inlet and outlet openings, a valve member movable in opposite directions to open and close said passage, said inner housing having an integral flange portion detachably mounted on said body and defining one wall of a diaphragm chamber, a diaphragm closing said chamber and connected to said valve member to effect closure thereof, a spring housing for disengageably clamping said diaphragm against said flange portion, a spring disposed in said spring housing and acting against said diaphragm to bias said valve member to open position, and passage means in said body and said inner housing affording communication between said outlet opening and said diaphragm chamber so that predetermined pressure in said outlet opening will actuate said diaphragm to effect closure of said valve member, said spring housing and said inner housing being removable from said body to facilitate servicing of said regulator.

5. A fluid pressure regulator, comprising a body having a substantially smooth bore therein, inlet and outlet openings formed in said body and communicating respectively with the upper and lower ends of said bore, an inner generally cylindrical housing slidably received in said bore, said housing having a passage therein affording communication between said inlet and outlet openings, a valve member movable in opposite directions to open and close said passage, said inner housing having an integral end portion detachably mounted on said body and defining one wall of a diaphragm chamber, a diaphragm closing said chamber and connected to said valve member to effect closure thereof, means disengageably clamping said diaphragm against said end portion, a spring for biasing said valve member to open position, and passage means in said body and said inner housing affording communication between said outlet opening and said diaphragm chamber so that predetermined pressure in said outlet opening will actuate said diaphragm to effect closure of said valve member, said inner housing being removable from said body to facilitate servicing of said regulator.

6. A fluid pressure regulator, comprising a body having a substantially smooth bore therein, inlet and outlet openings formed in said body and communicating respectively with the upper and lower ends of said bore, an inner generally cylindrical housing slidably received in said bore, an annular groove in said housing between said openings, an annular sealing member in said groove and between said housing and said bore, said housing having a passage therein affording communication between said inlet and outlet openings, a valve member movable in opposite directions to open and close said passage, said inner housing having an integral flange portion detachably mounted on said body and defining one wall of a diaphragm chamber, a piston bore in said inner housing and extending between said diaphragm chamber and said passage, a piston movable in said piston bore and connected to said valve member for balancing inlet fluid pressure on said valve member, a diaphragm closing said chamber and connected to said valve member to effect closure thereof, a spring housing for disengageably clamping said diaphragm against said flange portion, a spring disposed in said housing and acting against said diaphragm to bias said valve member to open position, and passage means in said body and said inner housing affording communication between said outlet opening and said diaphragm chamber so that predetermined pressure in said outlet opening will actuate said diaphragm to effect closure of said valve member, said spring housing and said inner housing being removable from said body to facilitate servicing of said regulator.

7. A fluid pressure regulator, comprising a body having a substantially smooth bore therein, inlet and outlet openings formed in said body and communicating respectively with the upper and lower ends of said bore, an inner generally cylindrical housing slidably received in said bore, said housing having a passage therein affording communication between said inlet and outlet openings, a valve member movable in opposite directions to open and close said passage, said inner housing having an integral end portion detachably mounted on said body and defining one wall of a diaphragm chamber, a piston bore in said inner housing and extending between said passage and said diaphragm chamber, a piston movable in said piston bore and connected to said valve member for balancing inlet pressure thereon, a spring biasing said valve member to open position, a diaphragm closing said chamber and connected to said valve member to effect closure thereof, means disengageably clamping said diaphragm against said end portion of said inner housing, and passage means in said body and said inner housing affording communication between said outlet opening and said diaphragm chamber so that predetermined pressure in said outlet opening will actuate said diaphragm to effect closure of said valve member, said inner housing being removable from said body to facilitate servicing of said regulator.

References Cited in the file of this patent
UNITED STATES PATENTS

| | | |
|---|---|---|
| 1,210,891 | Blanchard et al. | Jan. 2, 1917 |
| 1,988,966 | Eckhouse | Jan. 22, 1935 |
| 2,012,162 | Furlong | Aug. 20, 1935 |
| 2,599,577 | Norgren | June 10, 1952 |
| 2,707,966 | Talpin | May 10, 1955 |

FOREIGN PATENTS

| | | |
|---|---|---|
| 517,132 | Great Britain | Jan. 22, 1940 |
| 818,079 | France | Sept. 17, 1937 |